United States Patent [19]

Iijima

[11] Patent Number: 5,712,881
[45] Date of Patent: Jan. 27, 1998

[54] DATA TRANSMISSION APPARATUS SELECTIVELY USING TWO CLOCK SIGNALS

[75] Inventor: Yasuo Iijima, Yokohama, Japan

[73] Assignee: Kabushiki Kaisha Toshiba, Kawasaki, Japan

[21] Appl. No.: 637,598

[22] Filed: Apr. 24, 1996

Related U.S. Application Data

[63] Continuation of Ser. No. 207,616, Mar. 9, 1994, abandoned.

[30] Foreign Application Priority Data

Mar. 24, 1993 [JP] Japan ................................. 5-065073

[51] Int. Cl.$^6$ ........................................... H04L 7/00
[52] U.S. Cl. ................................. 375/354; 375/377
[58] Field of Search .............................. 375/259, 377, 375/354; 235/380, 375; 395/275; 364/919, 237, 240.8, 238.2, 238.3, 227.2

[56] References Cited

U.S. PATENT DOCUMENTS 5,070,233  12/1991  Takizawa et al. ................. 235/380
5,099,141   3/1992  Utsunomiya ....................... 327/99

FOREIGN PATENT DOCUMENTS 0347894  12/1989  European Pat. Off. .

OTHER PUBLICATIONS

Patent Abstracts of Japan vol. 010, No. 348 (p-519), Nov. 22, 1986 & JP-A-61 147386 (Tokyo Tatsuno Co., Ltd.) Jul. 5, 1986. (English Translation).

*Primary Examiner*—Don N. Vo
*Attorney, Agent, or Firm*—Cushman Darby & Cushman IP Group of Pillsbury; Madison & Sutro LLP

[57] ABSTRACT

Disclosed is a data transmission system comprising a first device having first clock generator for generating a first clock signal for data exchange with a second device, second clock generator for generating a second clock signal for resetting the second device to be operable, and clock supplying unit for supplying the first and second clock signals to the second device, and the second device for performing data exchange with the first device in response to the first clock, the second device being reset by the second clock. It is thus possible to ensure data exchange using existing hardware such as a UART, while supplying a reset clock whose frequency will not be a multiple of 1200 bps even by frequency division by $2^n$, to the IC card. This data transmission system will therefore cope with both the demand for the ISO standardization and the use of existing hardware.

4 Claims, 2 Drawing Sheets

DATA TRANSMISSION APPARATUS SELECTIVELY USING TWO CLOCK SIGNALS

This is a continuation of application Ser. No. 08/207,616, filed on Mar. 9, 1994 abandoned.

BACKGROUND OF THE INVENTION

1. Field of the Invention

The present invention relates to a data transmission system which is capable of compatibility with the demand for the ISO standardization using existing hardware.

2. Description of the Related Art

Recently, data transmission systems which use an IC card as a portable data storage media have been widely noted. This IC card is generally operable upon reception of power, clocks, etc. from an external device. With regard to signals supplied to IC cards, there is an international standard already established by ISO/IEC7816-3. This standard specifies that, upon receiving the initial response data (which will be called "Answer to Reset") from an IC card, a clock of 3.5712 MHz should be supplied to the IC card to cause the Answer to Reset to be transmitted at a rate of 9600 bps. After that, different ratios between the input frequency and the data transmission rate should selectively be used for subsequent data exchanges, as needed. A technique for switching clock signals supplied to the IC card is disclosed in U.S. Pat. No. 5,099,141. The ISO standard requires a frequency of 3.5712 MHz to reset IC cards.

However, a basic clock used in the conventional hardware for data exchange at the rate of 9600 bps cannot be obtained by simply $2^n$ frequency-dividing this frequency of the ISO standard, 3.5712 MHz. If an external device tries to accomplish data exchange with an IC card using a UART or the like, it should divide this frequency irregularly or employ some other method to produce the basic clock. This makes the hardware of the external device complex and redundant. It is also difficult to produce a clock with a highly precise frequency even using the irregular frequency division. Further, in the apparatus disclosed in the above U.S. Pat. No. 5,099,141, the clock used for transmitting/receiving data between the apparatus and the IC card is not provided.

SUMMARY OF THE INVENTION

It is an object of the present invention to provide a data transmission system that is capable of exchanging data using existing hardware such as a UART, while supplying to the IC card a new clock whose frequency is not of 1200 bps even by $2^n$ frequency division, in response to the ISO standard.

According to one aspect of the present invention, there is provided a data transmission system comprising: first clock generating means for generating a first clock signal for data exchange with a device, second clock generating means for generating a second clock signal for resetting the device to be operable, and clock supplying one of means for supplying the first and second clock signals to the device; and means for performing data exchange with the device based on the first clock.

According to another aspect of the present invention, there is provided a portable medium processing apparatus for transmitting/receiving data to/from a portable medium by supplying a clock signal to the portable medium, comprising: first means for generating a first clock supplied to the portable medium as a clock used for operating the portable medium; second means for generating a basic clock used for transmitting data between the apparatus and the portable medium; means for switching a clock supplied to the portable medium from the first clock generated by the first generating means to the second clock generated by the second generating means after the apparatus receives an answer-to-reset signal from the portable medium; and means for transmitting/receiving data to/from the portable medium on the basis of the second clock generated by the second generating means while the second clock is supplied to the portable medium and after the first clock.

According to still another aspect of the present invention, there is provided a portable medium processing apparatus for transmitting/receiving data to/from a portable medium by supplying a clock signal to the portable medium, comprising: first means for generating a clock signal of 3.5712 MHz supplied to the portable medium as a clock signal used for operating the portable medium, second means for generating a clock signal of $1200 \times 2^n$ Hz (n: natural number) used for transmitting data between the apparatus and the portable medium; means for frequency-dividing the clock signal generated by the second generating means into $\frac{1}{2^m}$ (m: natural number, m<n); means for switching the clock supplied to the portable medium from the clock of 3.5712 MHz generated by the first generating means to the clock of $1200 \times 2^n$ Hz generated by the frequency-dividing means after the apparatus receives an answer-to-reset signal from the portable medium; and means for transmitting/receiving data to/from the portable medium on the basis of the second generating means while the clock of 3.5712 MHz generated by the first generating means is supplied to the portable medium and while the clock generated by the second generating means and frequency-divided by the frequency-dividing means is supplied to the portable medium.

In the present invention, it is possible to supply a first clock with a first frequency which permits data exchange using existing hardware and a second clock with a second frequency which resets an IC card to be operable as required by the ISO standard. It is therefore possible to ensure data exchange using existing hardware such as a UART based on the first clock with the first frequency, while supplying to the IC card the second clock with the second frequency, which will not be 1200 bps, even by $2^n$ frequency division as required.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a preferred embodiment of the invention, and together with the general description given above and the detailed description of the preferred embodiments given below, serve to explain the principles of the invention.

DETAILED DESCRIPTION OF THE PREFERRED EMBODIMENT

A preferred embodiment of the present invention will be described hereinbelow with reference to the accompanying drawings.

Figure 1:
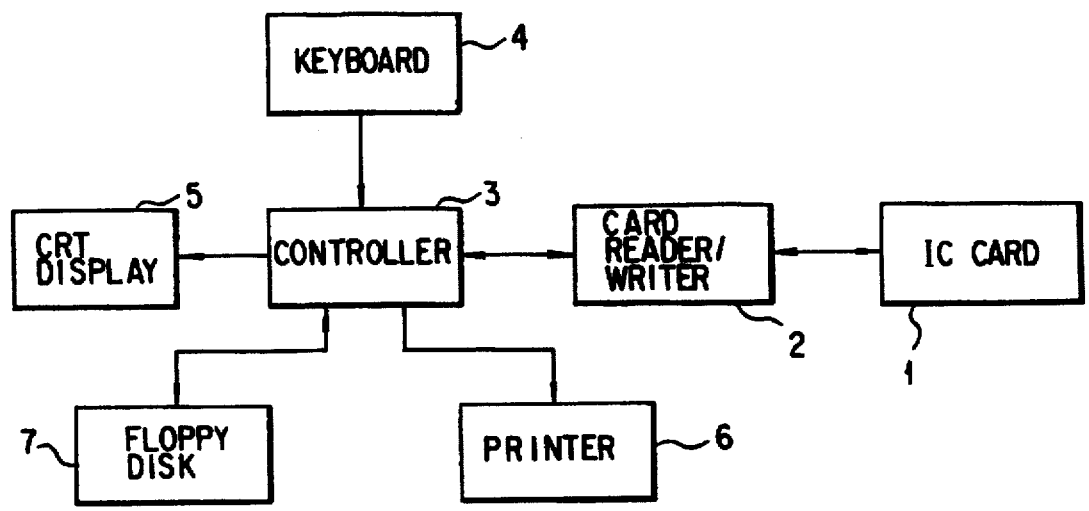
FIG. 1 is a block diagram illustrating the system structure of a terminal device which is designed to handle an IC card, as a data transmission system of the present invention.

FIG. 1 is a block diagram illustrating the system structure of a terminal device as a data transmission system of the present invention, which is designed to handle an IC card. This terminal device, which is used in a finance system or a shopping system, for example, permits an IC card 1 to be connected via a card reader/writer 2 to a controller 3 that comprises a CPU or the like. The terminal device has a keyboard 4, a CRT display 5, a printer 6 and a floppy disk drive 7 all connected to the controller 3. The IC card 1 is possessed by a user and is used to collate the personal identification number only the user knows with an entered personal identification number at the time when the user buys some commodities or accumulates necessary data, for example.

Figure 2:
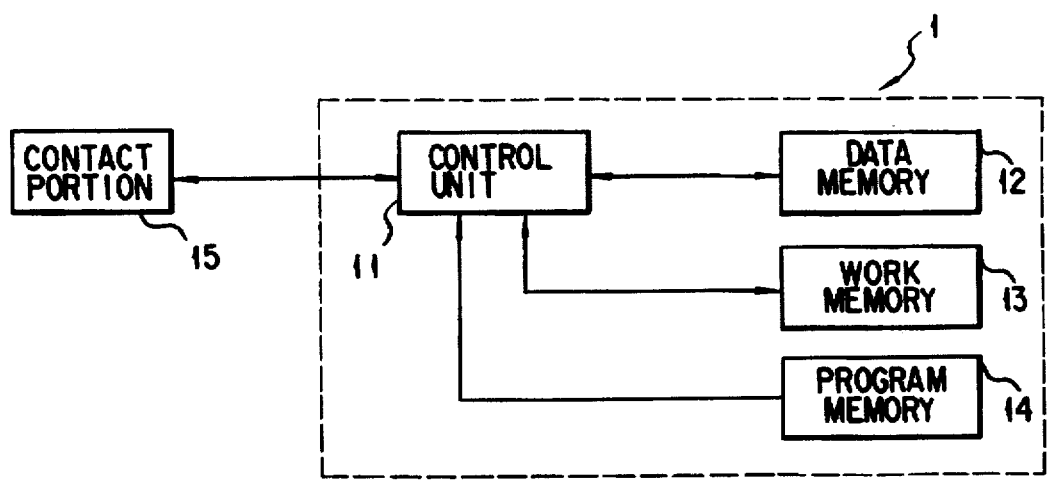
FIG. 2 is a block diagram schematically showing the structure of the IC card.

FIG. 2 is a block diagram schematically showing the structure of the IC card 1. To perform its various functions, the IC card 1 comprises a control unit (control means) 11 such as a CPU which serves as a controller, a data memory (memory unit) 12, a working memory 13, a program memory 14 and a contact portion 15 for providing electric contact with the aforementioned card reader/writer 2. Among those elements, control unit 11, data memory 12, working memory 13 and program memory 14 are constituted in a single IC chip or a plurality of IC chips, and are buried in the main body of the IC card. The data memory 12 is used to store various data and is constituted of a non-volatile memory such as an EEPROM whose memory contents are erasable. This data memory 12 consists of one common data file which is commonly used for all application programs, and a plurality of application data files which are separately used for the respective application programs. Each data file has key data (personal identification number) stored as plural pieces of certification or identification information, and has a plurality of areas. The working memory 13 constituted of a RAM, for example, temporarily holds processed data when the CPU performs some processing. The program memory 14 constituted of a masked ROM, for example, holds a control program for the control unit 11 or the like. The control program has subroutines to accomplish the aforementioned individual basic functions.

Figure 3:
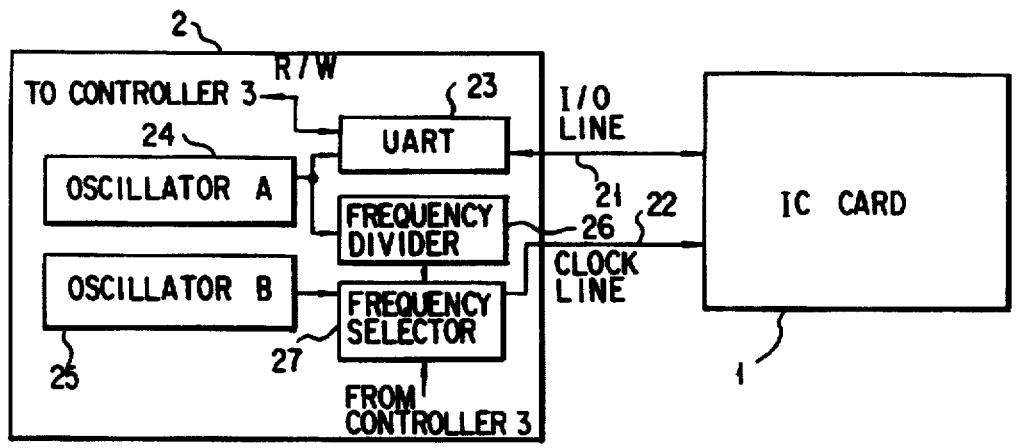
FIG. 3 is a diagram showing the connection between a card reader/writer and an IC card.

FIG. 3 shows the connection between the card reader/writer (R/W) 2 and the IC card 1. Connected to the IC card 1 are an I/O line 21 and a clock line 22 and other signal lines (not shown) from the card reader/writer 2 shown in FIG. 1. The I/O line 21 is used for data exchange with the IC card 1. The clock line 22 is provided to supply clocks necessary to operate the IC card 1. The other signal lines are used to supply Vcc, GND and reset signals. The card reader/writer 2 includes a UART 23 as a series interface connected to the I/O line 21 and the controller 3, a first oscillator (oscillator A) 24 for generating a first clock with a first frequency, a second oscillator (oscillator B) 25 for generating a second clock with a second frequency, a frequency divider 26 for dividing the first frequency of the first clock from the first oscillator 24, and a frequency selector 27 for selecting one of the frequencies provided by the second oscillator 25 and the frequency divider 26. The card reader/writer 2 performs data exchange with the IC card 1 using the first clock signal from the first oscillator 24. The first oscillator 24 generates a first clock with a frequency of, for example, $1200 \times 2^n$ so that, if this frequency is divided by $2^m$ ($m \leq n$), data exchange at the transmission rate of, for example, 9600 bps becomes possible through the I/O line 21. The second oscillator 25 generates a second clock signal to operate the IC card 1. For example, the second oscillator 25 generates a second whose frequency will not be 1200 bps even by 2K frequency division ($k \leq n$), such as 3.5712 MHz that is required as a reset frequency by the ISO standard. The data exchange with the IC card 1 is accomplished by software stored in the program memory 14. Data transmission and reception are performed at the rate of 9600 bps using a software timer or the like on the assumption that a clock with a frequency other than $1200 \times 2^n$ is supplied to the IC card 1.

Figure 4:
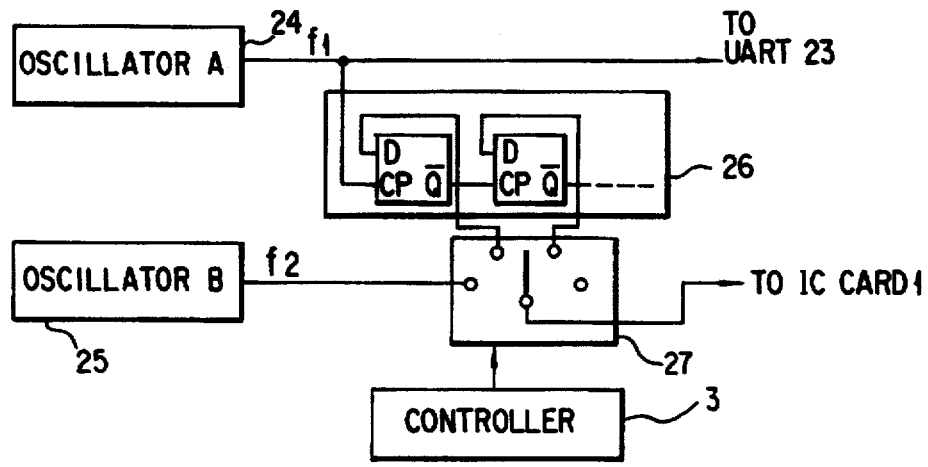
FIG. 4 is a block diagram showing the connection between first and second oscillators in FIG. 3.

FIG. 4 is a block diagram showing in enlargement the connection between first and second oscillators 24 and 25 shown in FIG. 3. The first oscillator 24 has its output connected to the UART 23 and the frequency divider 26, and outputs a first clock of a first frequency f1 directly to the UART 23. The frequency divider 26 divides the first frequency f1 in a manner which will be described later, and outputs the resultant clock signal. The second oscillator 25 has its output connected to the frequency selector 27, which comprises a switch circuit, for example, and supplies a second clock with a second frequency f2 to the frequency selector 27. The frequency selector 27 receives the clock with the divided frequency from the frequency divider 26, and selectively outputs either the second frequency or the divided frequency to the IC card 1 in accordance with an instruction from the controller 3.

Figure 5:
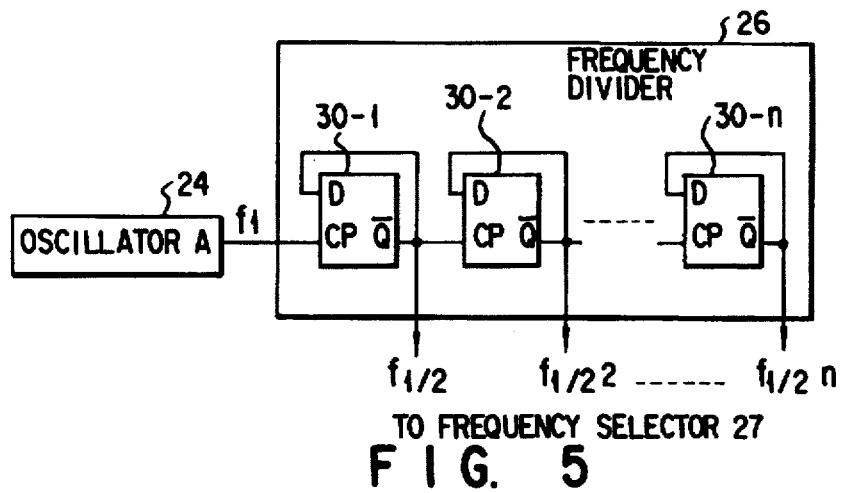
FIG. 5 is a block diagram exemplifying the structure of a frequency divider in FIG. 4.

FIG. 5 is a block diagram exemplifying the structure of the frequency divider 26 shown in FIG. 4. The frequency divider 26 comprises a plurality of cascade-connected D-type flip-flops (D-F/F) 30, for example. The clock output from the first oscillator 24 is connected to a clock input section CP of the D-type flip-flop 30-1 of the first stage in the frequency divider 26. The D-type flip-flop 30-1 has its output $\overline{Q}$ connected to an input D. The output $\overline{Q}$ is connected to a clock input section CP of the D-type flip-flop 30-2 of the second stage. In this manner, n D-type flip-flops are cascade-connected. When the frequency of the output clock from the first oscillator 24 is f1, a clock of a frequency of $f1/2^n$ Hz will appear on the output $\overline{Q}$ of the D-flip-flop 30-n of the n-th stage. Thus, the frequency selector 27 can select one of the second frequency f2 for resetting, and the individual frequencies $f1/2, f1/2^2, \ldots, f1/2^n$ obtained by dividing the first frequency f1 for normal operation. For example, to provide the rate of 9600 bps with the frequency f1=4.9152 MHz, nine D-type flip-flops should be used.

According to the present invention, as described above, it is possible to ensure data exchange using existing hardware such as a UART using the conventional clock, while supplying a new clock whose frequency (second frequency) will not be the rate of 1200 bps even by $2^n$ frequency division, to the IC card.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A portable medium processing apparatus for transmitting data to and for receiving data from a portable medium by supplying a clock signal to said portable medium, the apparatus comprising:

a first oscillator for generating a first clock signal of $1200 \times 2^n$ Hz, where n is a natural number, based upon which data is transmitted between said apparatus and said portable medium;

a second oscillator for generating a second clock signal of 3.5712 MHz used to operate said portable medium;

a frequency divider dividing said first clock signal generated by said first oscillator by $2^m$, where m is a natural number, and where m<n;

a frequency selector, connected to said second oscillator and said frequency divider, to select one of said second clock signal and an output of said frequency divider; and a data exchange circuit connected to said frequency selector for transmitting data to and receiving data from said portable medium on the basis of output from said frequency selector.

2. The apparatus according to claim 1, wherein said frequency divider includes said number m ½-dividers.

3. A portable medium processing apparatus for transmitting data to and receiving data from a portable medium by supplying a clock signal to said portable medium, the apparatus comprising:

a first oscillator for generating a first clock signal of $1200 \times 2^n$ Hz, where n is a natural number, based upon which signal data is transmitted between said apparatus and said portable medium;

a second oscillator for generating a second clock signal of a frequency other than $1200 \times 2^k$ Hz, where k is a natural number, said second clock signal being used to operate said portable medium;

a frequency divider dividing said first clock signal generated by said first oscillator by $2^m$, where m is a natural number, and where m<n;

a frequency selector, connected to said second oscillator and said frequency divider, to select one of said second clock signal and an output of said frequency divider; and a data exchange circuit connected to said frequency selector for transmitting data to and for receiving data from said portable medium on the basis of output from said frequency selector.

4. The apparatus according to claim 3, wherein said frequency divider includes said number m ½-dividers.

* * * * *